(12) United States Patent
Ito

(10) Patent No.: US 8,291,013 B2
(45) Date of Patent: Oct. 16, 2012

(54) COMMUNICATION APPARATUS AND STORAGE MEDIUM STORING PROGRAM

(75) Inventor: Tomohiro Ito, Mizuho (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 462 days.

(21) Appl. No.: 12/718,759

(22) Filed: Mar. 5, 2010

(65) Prior Publication Data

US 2010/0235437 A1 Sep. 16, 2010

(30) Foreign Application Priority Data

Mar. 12, 2009 (JP) ................................. 2009-059546
Mar. 12, 2009 (JP) ................................. 2009-059547

(51) Int. Cl.
*G06F 15/16* (2006.01)
(52) U.S. Cl. ........ 709/203; 709/219; 345/596; 345/545; 345/660; 715/771
(58) Field of Classification Search .................. 709/203, 709/219
See application file for complete search history.

(56) References Cited

U.S. PATENT DOCUMENTS

| | | | | |
|---|---|---|---|---|
| 6,115,138 | A * | 9/2000 | Yanaka | 358/1.9 |
| 7,705,864 | B2 * | 4/2010 | Ahmed et al. | 345/667 |
| 8,117,102 | B1 * | 2/2012 | Buck | 705/35 |
| 2010/0138371 | A1 | 6/2010 | Ishii | |

FOREIGN PATENT DOCUMENTS

| | | |
|---|---|---|
| JP | 2002-073609 A | 3/2002 |
| JP | 2003-050735 A | 2/2003 |
| JP | 2003-099317 A | 4/2003 |
| JP | 2003-150487 A | 5/2003 |
| JP | 2004-246822 A | 9/2004 |
| JP | 2006-099341 A | 4/2006 |
| JP | 2007-115137 A | 5/2007 |
| JP | 2007-122513 A | 5/2007 |
| JP | 2007-148885 A | 6/2007 |
| JP | 2007-299273 A | 11/2007 |
| JP | 2008-071116 A | 3/2008 |

(Continued)

OTHER PUBLICATIONS

Japan Patent Office; Notification of Reason for Refusal for Patent Application No. JP2009-059546, mailed Dec. 28, 2010.

(Continued)

*Primary Examiner* — Jude Jean Gilles
(74) *Attorney, Agent, or Firm* — Baker Botts L.L.P.

(57) ABSTRACT

A communication apparatus including: a communicating portion communicable with a server device storing feed information including content informations; a feed-information obtaining portion which obtains the feed information; a display portion which displays informations; a storage portion which stores informations; an updated-date-and-time extracting portion which extracts, from the feed information, an updated date and time indicating a date and time at which information constituted by at least part of the feed information has been updated; an updated-date-and-time storing portion which stores, into the storage portion, the updated date and time and the information constituted by at least part of the feed information in association with each other; and a display controller which displays at least part of the content information(s) corresponding to the information constituted by at least part of the feed information associated by the updated-date-and-time storing portion in order of the updated date and time from the latest one.

20 Claims, 11 Drawing Sheets

FOREIGN PATENT DOCUMENTS

| | | |
|---|---|---|
| JP | 2008-077142 A | 4/2008 |
| JP | 2008-158589 A | 7/2008 |
| JP | 2008-198008 A | 8/2008 |
| JP | 2008-210042 A | 9/2008 |
| JP | 2008-262346 A | 10/2008 |
| JP | 2008-299788 A | 12/2008 |
| WO | 2009-019784 A1 | 2/2009 |

OTHER PUBLICATIONS

Japanese Patent Office, Decision of Refusal for Japanese Patent Application No. 2009-059547, dispatched May 31, 2011.

Mamoru Kano, "Quartz Composer Book," BNN Shinsha, 129-137 (1st Ed., Japan, Oct. 1, 2008).

Japan Patent Office; Notification of Reason for Refusal for Patent Application No. 2009-059547, mailed Dec. 7, 2010.

Website entitled "Dirty News Reader" at http://www.forest.impress.co.jparticle/2004/05/26/dirtynewsreader.html. Published May 26, 2004 (searched Jul. 29, 2008).

* cited by examiner

FIG.2

URL STORAGE AREA ↙44

| IDENTIFICATION NUMBER 100 | SITE URL 102 | OBTAINING SETTING 103 | OBTAINING STATUS 104 |
|---|---|---|---|
| 0 | http://www.example0.com | OBTAIN | AFTER UPDATE |
| 1 | http://www.example1.com | NOT OBTAIN | BEFORE UPDATE |
| 2 | http://www.example2.com | OBTAIN | BEFORE UPDATE |
| ... | ... | ... | ... |
| n−1 | http://www.examplen−1.com | NOT OBTAIN | BEFORE UPDATE |

COMMUNICATION APPARATUS AND STORAGE MEDIUM STORING PROGRAM

CROSS REFERENCE TO RELATED APPLICATION

The present application is based on Japanese Patent Application Nos. 2009-059546 filed on Mar. 12, 2009, and 2009-059547 filed on Mar. 12, 2009, the contents of which are incorporated herein by reference.

BACKGROUND OF THE INVENTION

1. Field of the Invention

The present invention relates to a communication apparatus for displaying content information published on a RSS site.

2. Description of the Related Art

Web pages are published by various server devices. Among the server devices is a server (an RSS server) on which are published a plurality of content informations in each of which information described on the web page is assembled. Each content information includes a content URL designating a linked web page, a content title representing the linked web page, and content summary summarizing information of the linked web page. Where a plurality of the content informations are published, the content informations are published as feed information (Feed). A format of the feed information includes RSS (Resource Description Framework Site Summary) and Atom, for example. In the conventional technique, there is a software (an RSS reader) for regularly obtaining the feed informations and displaying content titles included therein. Where this software is installed on a PC, a user can browse or look at each content title.

SUMMARY OF THE INVENTION

The above-mentioned RSS server irregularly updates the content informations, that is, the server irregularly updates feed information including the content informations. A frequency of update varies with RSS servers. One RSS server updates the information on a daily basis, and another RSS server updates the information once in two months. A user generally wants new content informations. Thus, the user usually checks whether the content informations have been updated or not using the RSS reader. For example, as described above, there is a case in which content informations included in the feed information obtained from the RSS server that updates the information once in two months and content informations included in the feed information obtained from the RSS server that updates once a day are displayed in order. That is, there is a case in which each of the RSS servers is ranked, and the feed informations (i.e., the content informations) obtained from the RSS servers are displayed in order of the ranks. In this case, where the user browses the content informations on a daily basis, the content informations updated only once in two months may be displayed first, and then the content informations updated once a day are displayed. Thus, for the user who wants new content informations updated on a daily basis, it is difficult to browse the new content informations immediately. Further, in the case where content information having unknown updated date and time is included among a plurality of content informations included in the same feed information, when the plurality of the content informations are displayed in units of feed informations, the content information having unknown updated date and time may be displayed before the content information having the latest date and time. Also in this case, it is difficult for the user to speedily browse the new content informations.

This invention has been developed in view of the above-described situations, and it is an object of the present invention to provide, with a high priority, a communication apparatus which can provide a user with content information whose updated date and time is assumed to be new.

The object indicated above may be achieved according to the present invention which provides a communication apparatus comprising: a communicating portion communicable with a server device storing feed information including a plurality of content informations each relating to a content; a feed-information obtaining portion configured to obtain the feed information from the server device by using the communicating portion; a display portion configured to display various informations; a storage portion configured to store various informations; an updated-date-and-time extracting portion configured to extract, from the feed information obtained by the feed-information obtaining portion, an updated date and time indicating a date and time at which information constituted by at least part of the feed information has been updated; an updated-date-and-time storing portion configured to store, into the storage portion, the updated date and time extracted by the updated-date-and-time extracting portion and the information constituted by at least part of the feed information in association with each other; and a display controller configured to display at least part of at least one content information corresponding to the information constituted by at least part of the feed information associated by the updated-date-and-time storing portion, on the display portion in order of the updated date and time from the latest one.

The object indicated above may also be achieved according to the present invention which provides a storage medium storing a program executed by a communication apparatus including (a) a communicating portion communicable with a server device storing feed information including a plurality of content informations each indicating a content, (b) a display portion configured to display various informations, and (c) a storage portion configured to store various informations, the program comprising: obtaining the feed information from the server device by using the communicating portion; extracting, from the feed information, an updated date and time indicating a date and time at which information constituted by at least part of the feed information has been updated; storing, into the storage portion, the extracted updated date and time and the information constituted by at least part of the feed information in association with each other; and displaying at least part of at least one content information corresponding to the information constituted by at least part of the feed information associated by the updated-date-and-time storing portion, on the display portion in order of the updated date and time from the latest one.

Here, the content information is information in which a content of a web page is concisely expressed, and the content information includes at least one of a content title, a summary of the content representing, e.g., an overview of the content, a content URL, and a data and time at which the content has been updated. Hereinafter, the "content information" may be referred to as the "content". Further, the updated date and time is a concept including a date and time at which the content has been published and a date and time at which the content has been updated.

BRIEF DESCRIPTION OF THE DRAWINGS

The objects, features, advantages, and technical and industrial significance of the present invention will be better understood by reading the following detailed description of embodiments of the invention, when considered in connection with the accompanying drawings, in which:

FIG. 2 is an example of a storing content of a URL storage area;

DESCRIPTION OF THE EMBODIMENTS

Figure 1:
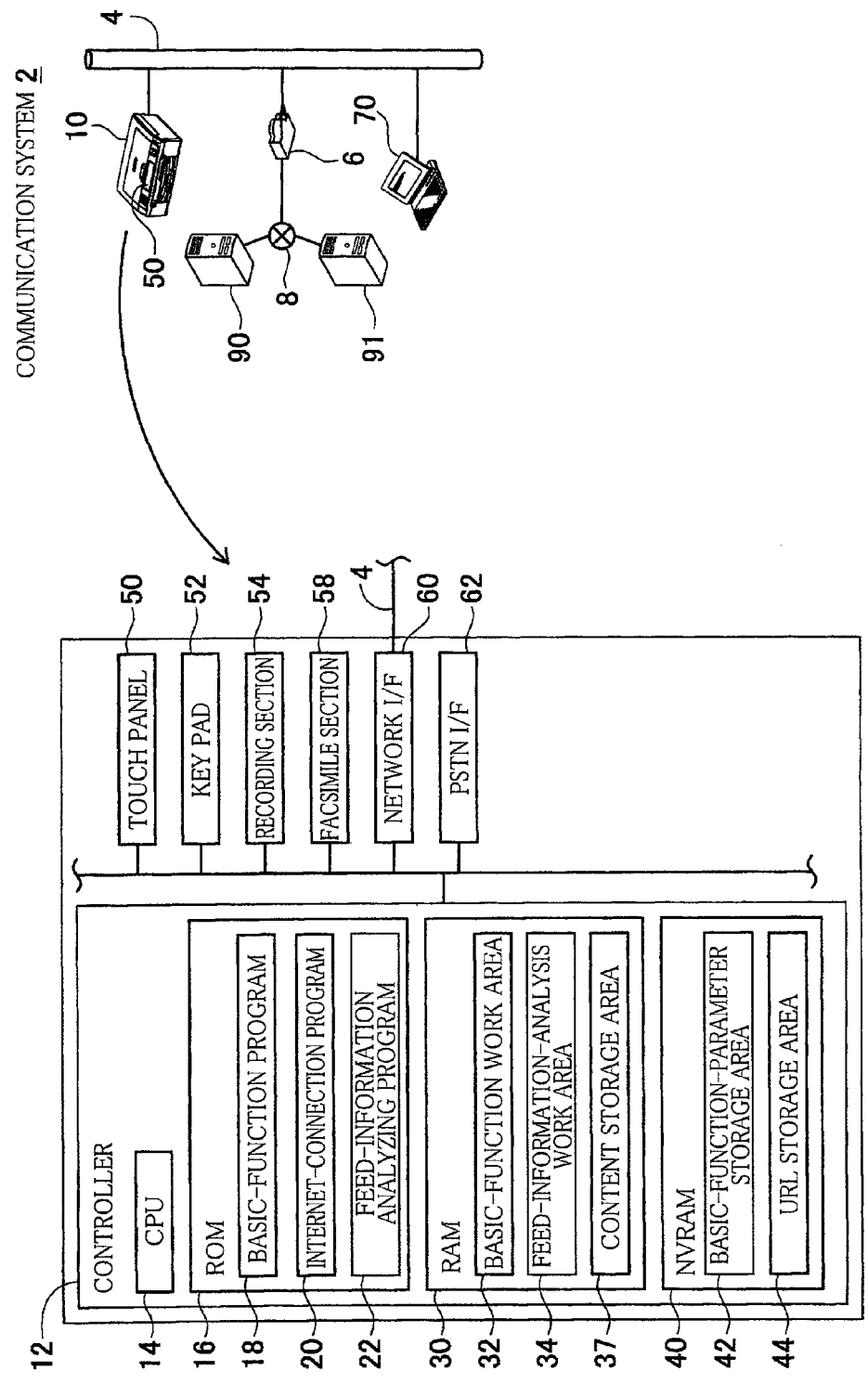
FIG. 1 is a conceptual view showing a communication system as a first embodiment.

Hereinafter, there will be described a first embodiment of the present invention by reference to FIGS. 1-7.

A communication system 2 includes a communication apparatus 10, a PC 70, and a plurality of content distribution servers (i.e., server devices) 90, 91. The communication apparatus 10 is connected to a LAN line 4. Likewise, the PC 70 is connected to the LAN line 4. The LAN line 4 is connected to an internet 8 via a router 6. Each of the content distribution servers 90, 91 is connected to the internet 8. In the present embodiment, the content distribution server 90 publishes one site while the content distribution server 91 publishes another site. Each site includes a plurality of contents. Each of the content distribution servers 90, 91 stores feed information 101 (feed information in RSS format) including a plurality of content informations 132 of the corresponding site. The feed information 101 and the content information 132 will be explained in detail below. It is noted that the feed information 101 is information in which a summary of a web site is concisely described or expressed in RSS (RDF Site Summary) format, e.g., RSS 1.0, RSS 2.0, and Atom.

The communication apparatus 10 includes a controller 12, a touch panel (i.e., a display portion) 50, key pads 52, a recording section 54, a facsimile section 58, a network interface 60, a PSTN interface 62, and so on. The controller 12 includes a CPU 14, a ROM 16, a RAM 30, an NVRAM 40, and so on.

The CPU 14 performs or executes various processings in accordance with various programs stored in the ROM 16. The basic-function program 18 is a program for controlling basic operations of the communication apparatus 10. The basic-function program 18 includes, e.g., programs for producing display data based on which characters and images are displayed on the touch panel 50. Further, the basic-function program 18 includes, e.g., programs for controlling the recording section 54, the facsimile section 58, and so on. An Internet-connection program 20 is a program for making a connection with the internet 8. A feed-information analyzing program 22 is a program for analyzing the feed information 101 obtained from the content distribution servers 90, 91 and extracting a feed-updated date and time 110 representing a date and time at which the feed information 101 is updated (i.e., a date and time at which the feed information 101 is published where the feed information is published for the first time) and a content-updated date and time 106 representing a date and time at which a web page linked from the content information 132 is updated (i.e., a date and time at which the linked web page is published where the linked web page is published for the first time). Analyzed feed information 101b is stored into a content storage area (i.e., a part of a storage portion) 37. It is noted that the date and time described in the present specification is a concept not limited to a date and a time but including all time information (i.e., year, month, date, time, minute, and second).

Further, the feed information 101 includes the feed-updated date and time 110, the content informations 132, and a site URL 102 which is a URL for obtaining the feed information 101. Further, each content information 132 includes the content-updated date and time 106, a content title 107 representing a title of information of a web page linked from the content information 132, and a content summary 109 which is a summary of the information of the linked web page. Further, various information included in the feed information 101 is also included in the analyzed feed information 101b. It is noted that the feed information 101 includes the feed-updated date and time 110 representing the date and time at which the feed information 101 is updated, but the feed-updated date and time 110 is included in each feed information 101, which means that the feed information 101 is information as a unit used when the feed information 101 is updated. Likewise, each content information 132 included in the feed information 101 includes the content-updated date and time 106 representing the date and time at which the content information 132 is updated, but the content-updated date and time 106 is included in each content information 132, which means that the content information 132 is information as a unit used when the content information 132 is updated.

The NVRAM 40 includes a basic-function-parameter storage area 42 and a URL storage area 44. The basic-function-parameter storage area 42 is a storage area for storing various parameters (e.g., a recording setting, a facsimile setting, and so on) used when the CPU 14 performs the processing in accordance with the basic-function program 18. The basic-function-parameter storage area 42 stores time information. The time information stored in the basic-function-parameter storage area 42 always keep a time and thus represent a current time. The URL storage area 44 is a storage area for storing the site URLs 102 included in the content distribution servers 90, 91. For example, a user needs to store the site URL 102 into the URL storage area 44 with the key pads 52 or the like in order to receive a content distribution service from each of the content distribution servers 90, 91.

The network interface 60 is connected to the LAN line 4. The communication apparatus 10 can communicate with the PC 70 and access the internet 8.

The RAM 30 includes a basic-function work area 32, a feed-information-analysis work area 34, and the content storage area 37. The basic-function work area 32 is a storage area for storing various data produced in course of performance of the processing in accordance with the basic-function program 18. The feed-information-analysis work area 34 is a storage area for storing various data produced in course of performance of the processing in accordance with the feed-information analyzing program 22. The content storage area 37 stores the feed information 101b obtained from the content distribution servers 90, 91 and analyzed.

As shown in an example in FIG. 2, the URL storage area 44 stores n pieces of the site URLs 102. An identification number 100 is assigned to each site URL 102. Further, the URL storage area 44 stores an obtaining setting 103 and an obtaining status 104 in correspondence with each site URL 102. The obtaining setting 103 is a setting for determining whether the feed information 101 is obtained on the basis of the site URL 102 or not, and is set in advance by the user, for example. The obtaining status 104 is a status as information which represents whether the obtained feed information 101 has already been updated or not and based on which whether the feed information 101 is obtained or not is judged in a processing of S4 which will be described below.

Figure 5:
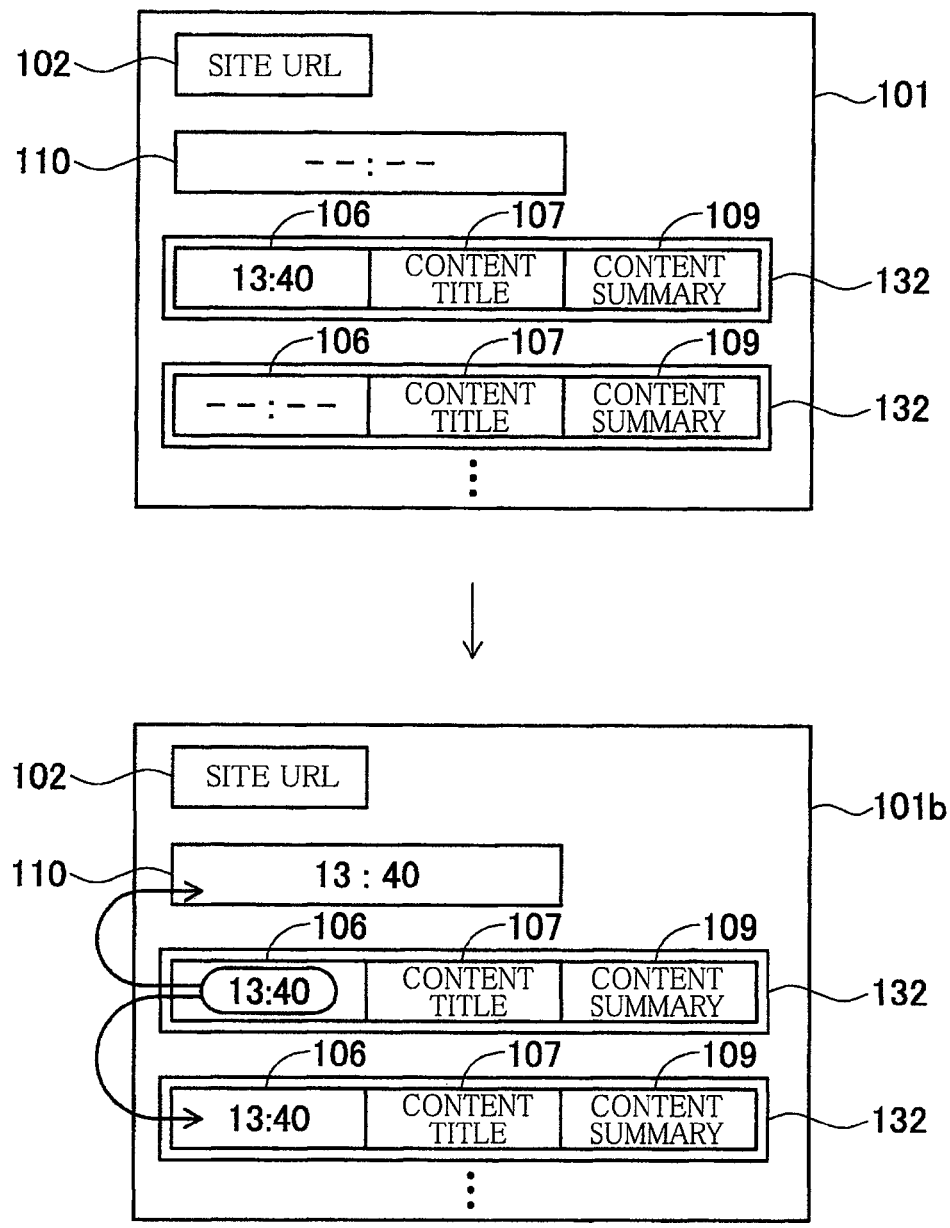
FIG. 5 is a conceptual view showing a change of information as a result of the update of the content.

There will be explained an example of a content of the feed information 101 with reference to FIG. 5. The feed information 101 includes various information (e.g., image data and the like) in addition to the site URL 102, the feed-updated date and time 110, and the content information 132 described above. Further, although not shown, to the site URL 102 is attached a tag representing that the site URL 102 is a site URL. This is the same for the feed-updated date and time 110, the content information 132, the content-updated date and time 106, the content title 107, and the content summary 109, that is, a tag is attached to each of informations included in the feed information 101. The CPU 14 can identify the various informations because the tag is attached to each information. Further, among the obtained feed informations 101 is the feed information 101 in which various time informations (e.g., the feed-updated date and time 110, the content-updated date and time 106, and so on) are not set.

Figure 3:
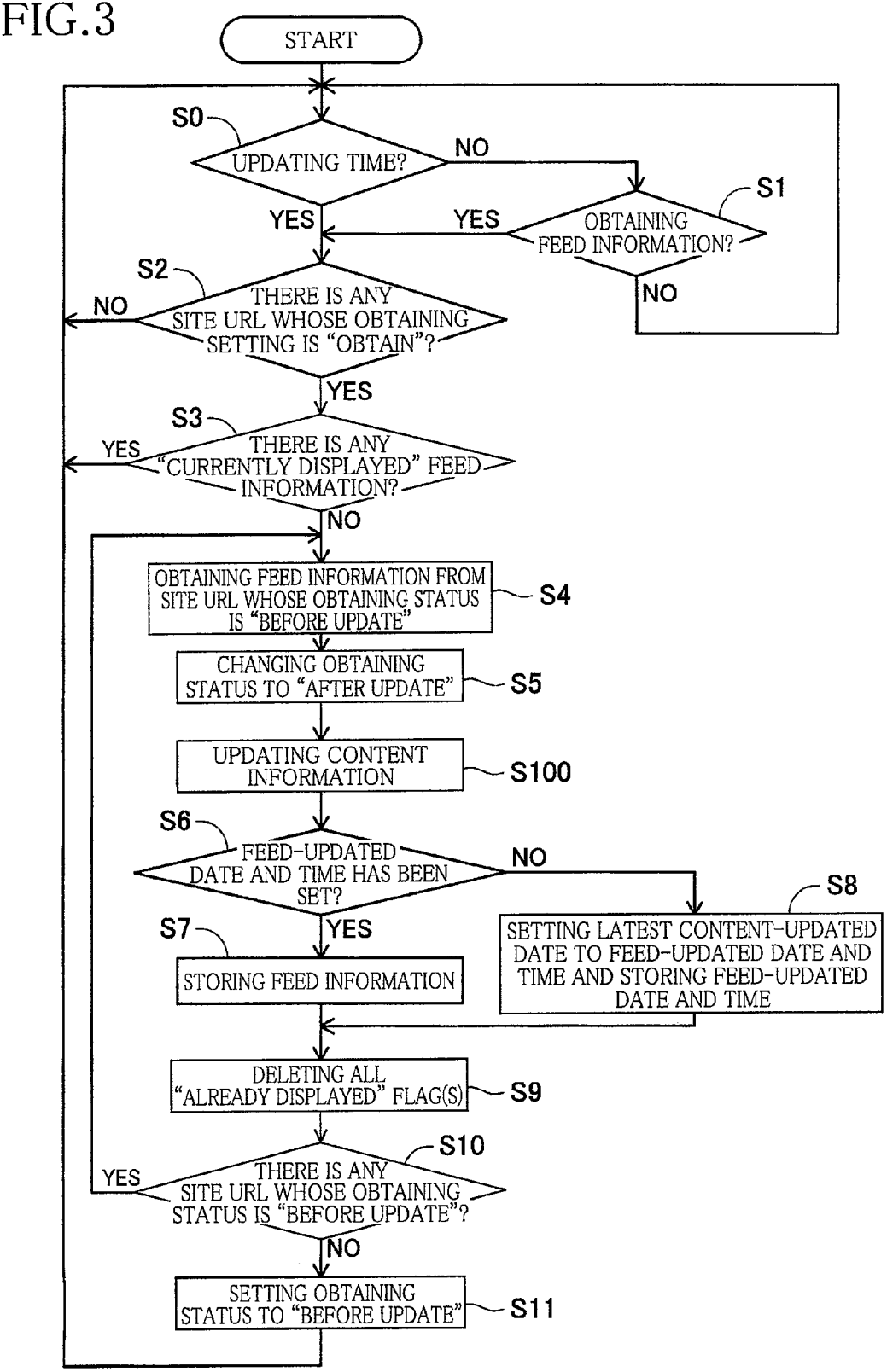
FIG. 3 is a flow-chart showing a main flow of a processing performed by a communication apparatus.

There will be explained an operation of the communication apparatus 10 with reference to a flow-chart shown in FIG. 3. A processing represented by the flow-chart is started when a power of the communication apparatus 10 is turned on.

In S0, the CPU 14 judges whether a time for updating the feed information 101 (i.e., an updating time) has passed or not. The time for updating the feed information 101 is a time set by the user. The time for updating the feed information 101 may be a certain length of time or a certain time. That is, the feed information 101 may be updated when the certain length of time has been passed or when the certain time has reached. Where the CPU 14 has judged that the time for updating the feed information 101 has passed (S0: YES), the processing goes to S2. Where the CPU 14 has judged that the time for updating the feed information 101 has not passed (S0: NO), the processing goes to S1.

In S1, the CPU 14 judges whether the user has commanded the communication apparatus 10 to obtain the feed information 101 or not. The command from the user is inputted with the key pads 52, for example. Where the user has commanded the communication apparatus 10 to obtain the feed information 101 (S1: YES), the processing goes to S2. Where the user has not commanded the communication apparatus 10 to obtain the feed information 101 (S1: NO), the processing goes to S0.

In S2, the CPU 14 judges whether the obtaining setting 103 of each site URL 102 stored in the URL storage area 44 has been set to "OBTAIN" or not by referring the site URL 102 stored in the URL storage area 44. The obtaining setting 103 can be set by the user as desired. Where the CPU 14 has judged that there is no site URL 102 in which the obtaining setting 103 thereof has been set to "OBTAIN" (S2: NO), the processing goes to S0. Where the CPU 14 has judged that there is any site URL 102 in which the obtaining setting 103 thereof has been set to "OBTAIN" (S2: YES), the processing goes to S3.

In S3, the CPU 14 judges whether a "CURRENTLY DISPLAYED" flag 112 is attached to any feed information 101b stored in the content storage area 37 or not. Here, the feed information 101b stored in the content storage area 37 is obtained before the current processing of S3 and stored in the content storage area 37 in past processings of S7 and S8 which will be described below. This is because the processing represented by the flow-chart shown in FIG. 3 is performed each time when the updating time has passed as described above. Where the CPU 14 has judged that there is any feed information 101b to which the "CURRENTLY DISPLAYED" flag 112 is attached (S3: YES), the processing goes to S0. Where the CPU 14 has judged that there is no feed information 101b to which the "CURRENTLY DISPLAYED" flag 112 is attached (S3: NO), the processing goes to S4. Here, the "CURRENTLY DISPLAYED" flag 112 is a mark set to the feed information 101b in a processing of S63 which will be described below. Where the "CURRENTLY DISPLAYED" flag 112 is attached, the content summary 109 included in the feed information 101b is being displayed on the touch panel 50.

In S4, the CPU 14 obtains the feed information 101 on the basis of the site URL 102 whose obtaining setting 103 is being set as "OBTAIN" and whose obtaining status 104 is "BEFORE UPDATE". In S5, the CPU 14 changes the obtaining status 104 of the site URL 102 designating the feed information 101 obtained in S4 from "BEFORE UPDATE" to "AFTER UPDATE".

Figure 4:
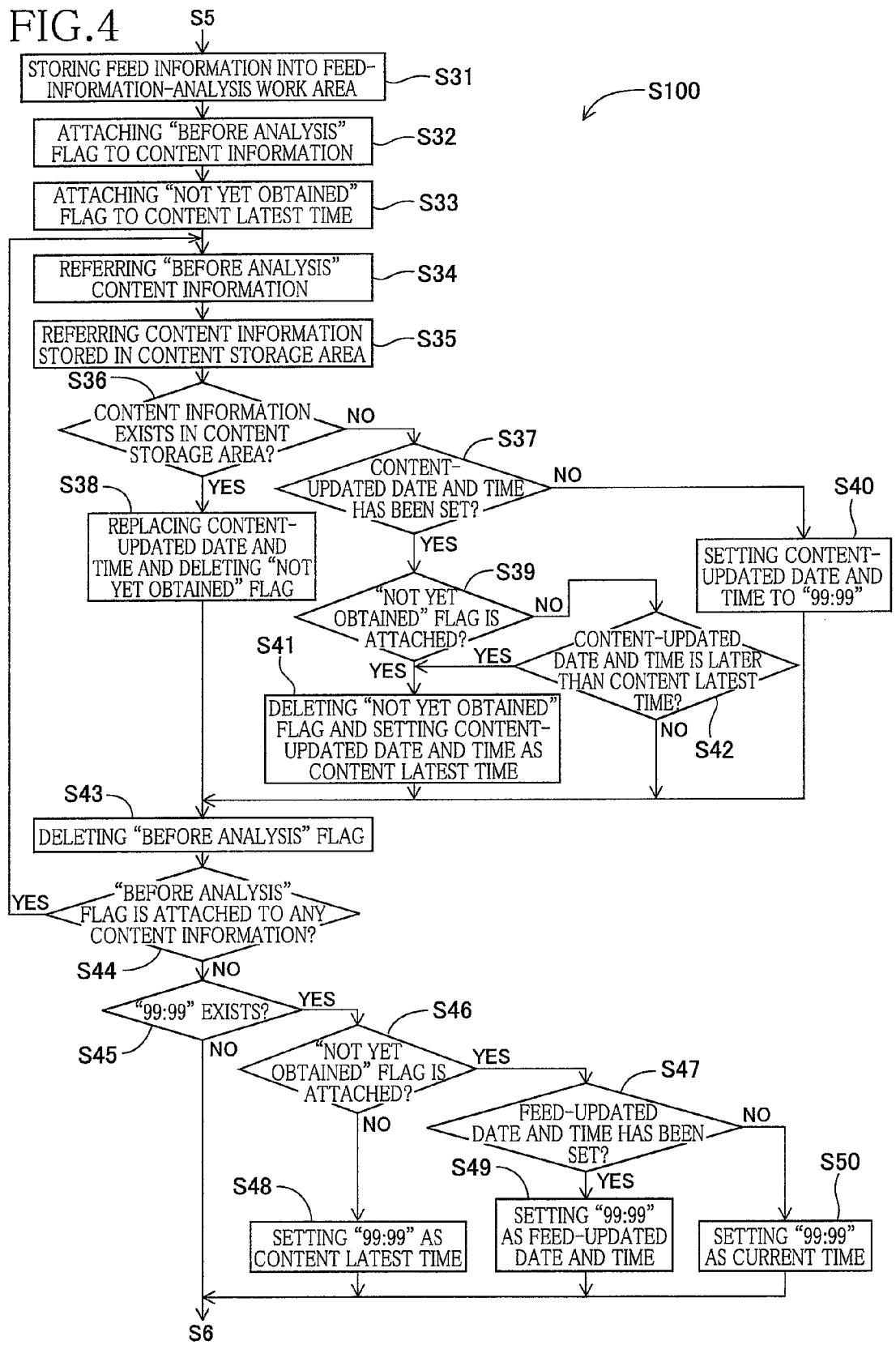
FIG. 4 is a flow-chart showing a processing for updating a content.

There will be explained a processing of S100 for updating the content information 132 with reference to FIG. 4. In S31, the CPU 14 stores the feed information 101 obtained in S4 into the feed-information-analysis work area 34. In S32, the CPU 14 attaches a "BEFORE ANALYSIS" flag to each content information 132 included in the feed information 101 stored in the feed-information-analysis work area 34. The "BEFORE ANALYSIS" flag is a mark indicating that the content information 132 included in the feed information 101 has not been subjected to processings of S34-S43.

In S33, the CPU 14 sets a status of a content latest (newest) time into the basic-function work area 32. In this time, a "NOT YET OBTAINED" flag is attached to the content latest time. The content latest time is an item set when the CPU 14 determines the latest one of a plurality of the content-updated date and times 106 of one of the obtained feed informations 101. At the time when the processings of S34-S44 which will be described below are all finished and the processing goes to S45, the latest one of the content-updated date and times 106 included in the obtained one feed information 101 has been set as the content latest time. Further, the "NOT YET OBTAINED" flag is a mark indicating that the content-updated date and time 106 has not been obtained from the plurality of the content informations 132 included in the obtained one feed information 101. In S34, the CPU 14 refers one of the content informations 132 which are stored in the feed-information-analysis work area 34 and to each of which the "BEFORE ANALYSIS" flag is attached. In S35, the CPU 14 refers all the content informations 132 stored in the content storage area 37.

In S36, the CPU 14 judges whether a content information 132 the same as the content information 132 referred in S34 is included in any of all the content informations 132 referred in S35 or not. Whether the content informations 132 are the same as each other or not is judged on the basis of the content title 107 and the content summary 109 included in each content information 132, for example. Where the CPU 14 has judged that the content information 132 the same as the content information 132 referred in S34 exists in the content storage area 37 (S36: YES), the processing goes to S38. Where the CPU 14 has judged that the content information 132 the same as the content information 132 referred in S34 does not exist in the content storage area 37 (S36: NO), the processing goes to S37.

In S37, the CPU 14 judges whether the content-updated date and time 106 has been set in the content information 132 referred in S34 or not. Where the CPU 14 has judged that the content-updated date and time 106 has been set in the content information 132 referred in S34 (S37: YES), the processing goes to S39. Where the CPU 14 has judged that the content-updated date and time 106 has not been set in the content information 132 referred in S34 (S37: NO), the processing goes to S40.

In S38, the CPU 14 sets the content-updated date and time 106 included in the content information 132 referred in S34, as the content-updated date and time 106 included in the same content information 132 stored in the content storage area 37, and then deletes the "NOT YET OBTAINED" flag of the content latest time.

In S39, the CPU 14 judges whether the "NOT YET OBTAINED" flag is attached to the content latest time stored in the basic-function work area 32 or not. Where the CPU 14 has judged that the "NOT YET OBTAINED" flag is attached to the content latest time stored in the basic-function work area 32 (S39: YES), the processing goes to S41. Where the CPU 14 has judged that the "NOT YET OBTAINED" flag is not attached to the content latest time stored in the basic-function work area 32 (S39: NO), the processing goes to S42.

In S40, the CPU 14 sets the content-updated date and time 106 included in the content information 132 referred in S34 to "99:99". This "99:99" is for representing that the content-updated date and time 106 has not been set. In S41, the CPU 14 deletes the "NOT YET OBTAINED" flag of the content latest time stored in the basic-function work area 32, and then sets the content-updated date and time 106 included in the content information 132 referred in S34 as the content latest time.

In S42, the CPU 14 compares the content latest time stored in the basic-function work area 32 and the content-updated date and time 106 included in the content information 132 referred in S34. Where the CPU 14 has judged that the content-updated date and time 106 is later or newer than the content latest time (S42: YES), the processing goes to S41. Where the CPU 14 has judged that the content-updated date and time 106 is earlier than or the same as the content latest time (S42: NO), the processing goes to S43.

In S43, the CPU 14 deletes the "BEFORE ANALYSIS" flag attached to the content information 132 referred in S34. In S44, the CPU 14 judges whether the "BEFORE ANALYSIS" flag is attached to any of the content informations 132 or not by referring all the content informations 132 included in the feed information 101 stored in the feed-information-analysis work area 34. Where the CPU 14 has judged that there is the content information 132 to which the "BEFORE ANALYSIS" flag is attached (S44: YES), the processing goes to S34. Where the CPU 14 has judged that there is no content information 132 to which the "BEFORE ANALYSIS" flag is attached (S44: NO), the processing goes to S45.

In S45, the CPU 14 judges whether the content information 132 in which the content-updated date and time 106 has been set to "99:99" exists in the feed-information-analysis work area 34 or not. Where the CPU 14 has judged that the content information 132 in which the content-updated date and time 106 has been set to "99:99" exists in the feed-information-analysis work area 34 (S45: YES), the processing goes to S46. Where the CPU 14 has judged that the content information 132 in which the content-updated date and time 106 has been set to "99:99" does not exist in the feed-information-analysis work area 34 (S45: NO), the processing goes to S6.

In S46, the CPU 14 judges whether the "NOT YET OBTAINED" flag is attached to the content latest time included in the basic-function work area 32 or not. Where the CPU 14 has judged that the "NOT YET OBTAINED" flag is attached to the content latest time included in the basic-function work area 32 (S46: YES), the processing goes to S47. Where the CPU 14 has judged that the "NOT YET OBTAINED" flag is not attached to the content latest time included in the basic-function work area 32 (S46: NO), the processing goes to S48.

In S47, the CPU 14 judges whether the feed-updated date and time 110 has been set in the feed information 101 stored in the feed-information-analysis work area 34 or not. Where the CPU 14 has judged that the feed-updated date and time 110 has been set (S47: YES), the processing goes to S49. Where the CPU 14 has judged that the feed-updated date and time 110 has not been set (S47: NO), the processing goes to S50.

In S48, the CPU 14 sets, as the content latest time included in the basic-function work area 32, "99:99" set as the content-updated date and time 106. In S49, the CPU 14 sets, as the feed-updated date and time 110, "99:99" set as the content-updated date and time 106. In S50, the CPU 14 sets, as the current time, "99:99" set as the content-updated date and time 106. Further, the CPU 14 sets, as the current time, the time information stored in the basic-function-parameter storage area 42.

The processing having been explained above is the processing in S100. Processings thereafter will be explained with reference to FIG. 3.

In S6, the CPU 14 judges whether the feed-updated date and time 110 has been set in the feed information 101 stored in the feed-information-analysis work area 34 or not. Where the CPU 14 has judged that the feed-updated date and time 110 has been set (S6: YES), the processing goes to S7. Where the CPU 14 has judged that the feed-updated date and time 110 has not been set (S6: NO), the processing goes to S8.

In S7, the CPU 14 stores the feed information 101 stored in the feed-information-analysis work area 34 into the content storage area 37 in association with the feed-updated date and time 110. Then, before the processing goes to S9, the CPU 14 deletes all the informations stored in the basic-function work area 32 and the feed-information-analysis work area 34. The informations deleted here includes the content latest time stored in the basic-function work area 32 and the feed information 101 stored in the feed-information-analysis work area 34.

In S8, the CPU 14 sets the feed-updated date and time 110 included in the feed information 101 stored in the feed-information-analysis work area 34, such that the feed-updated date and time 110 becomes the latest one of the content-updated date and times 106 included in the feed information 101, and stores the set feed-updated date and time 110 into the content storage area 37. Then, before the processing goes to S9, the CPU 14 deletes all the informations stored in the basic-function work area 32 and the feed-information-analysis work area 34. The informations deleted here includes the content latest time stored in the basic-function work area 32 and the feed information 101 stored in the feed-information-analysis work area 34.

Here, there will be explained effects of the processings of S100, S6, S7, and S8 with reference to FIG. 5.

The feed-updated date and time 110 may have not been sometimes set in the feed information 101 obtained in S4, and the content-updated date and time 106 may have not been sometimes set in the content information 132 included in the feed information 101. In S100, the content-updated date and time 106 is set to each content information 132 included in the feed information 101. Then, where the feed-updated date and time 110 has been set (S6: YES), the CPU 14 stores in S7 the feed information 101 stored in the feed-information-analysis work area 34 into the content storage area 37 in association with the feed-updated date and time 110. Where the feed-updated date and time 110 has not been set (S6: NO), the CPU 14 stores the feed-updated date and time 110 in association with the latest one of the content-updated date and times 106 included in the feed information 101. Thus, even where the feed-updated date and time 110 has not been set, the time can be set as the feed-updated date and time 110. It is noted that the reference numeral 101*b* shown in FIG. 5 denotes the feed information 101*b* stored into the content storage area 37.

In S9, the CPU 14 deletes all "ALREADY DISPLAYED" flag(s) 113 attached to the feed information(s) 101*b* stored in the content storage area 37. Here, the "ALREADY DISPLAYED" flag 113 is a mark indicating whether the feed information 101*b* has been displayed on the touch panel 50 or not by a processing of S64 which will be described below. The "ALREADY DISPLAYED" flag 113 is used in order to avoid displaying, on the touch panel 50, the content information 132 displayed in the past.

In S10, the CPU 14 judges whether there is any site URL 102 whose obtaining setting 103 has been set to "OBTAIN" and whose obtaining status is "BEFORE UPDATE" or not. Where the CPU 14 has judged that there is any site URL 102 whose obtaining status is "BEFORE UPDATE" (S10: YES), the processing goes to S4. Where the CPU 14 has judged that there is no site URL 102 whose obtaining status is "BEFORE UPDATE" (S10: NO), the processing goes to S11. In S11, the CPU 14 sets, to "BEFORE UPDATE", the obtaining status of each site URL 102 whose obtaining setting 103 has been set to "OBTAIN" and whose obtaining status is "AFTER UPDATE".

Figure 6:
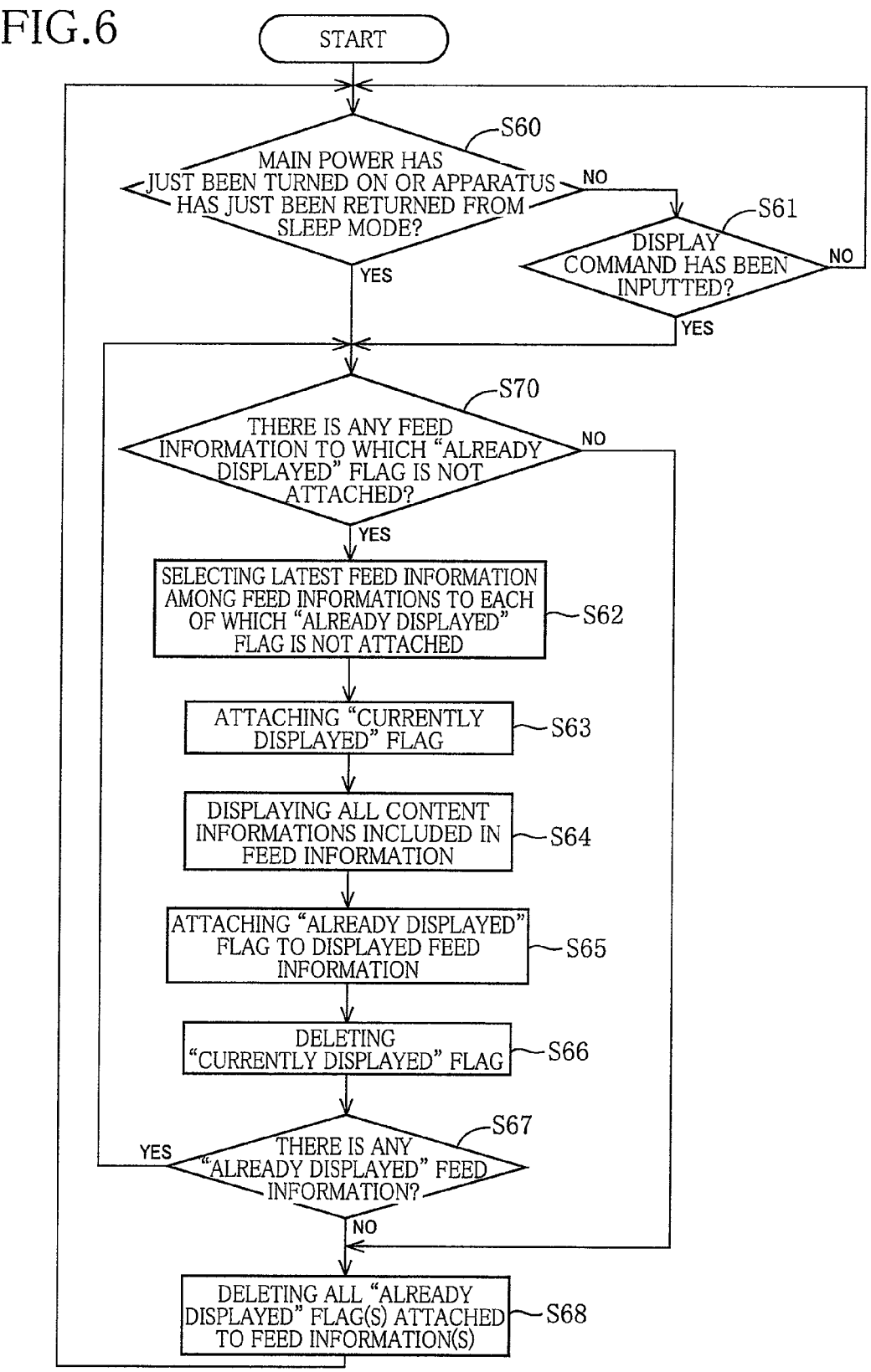
FIG. 6 is a flow-chart relating to a display of the content.
Figure 7:
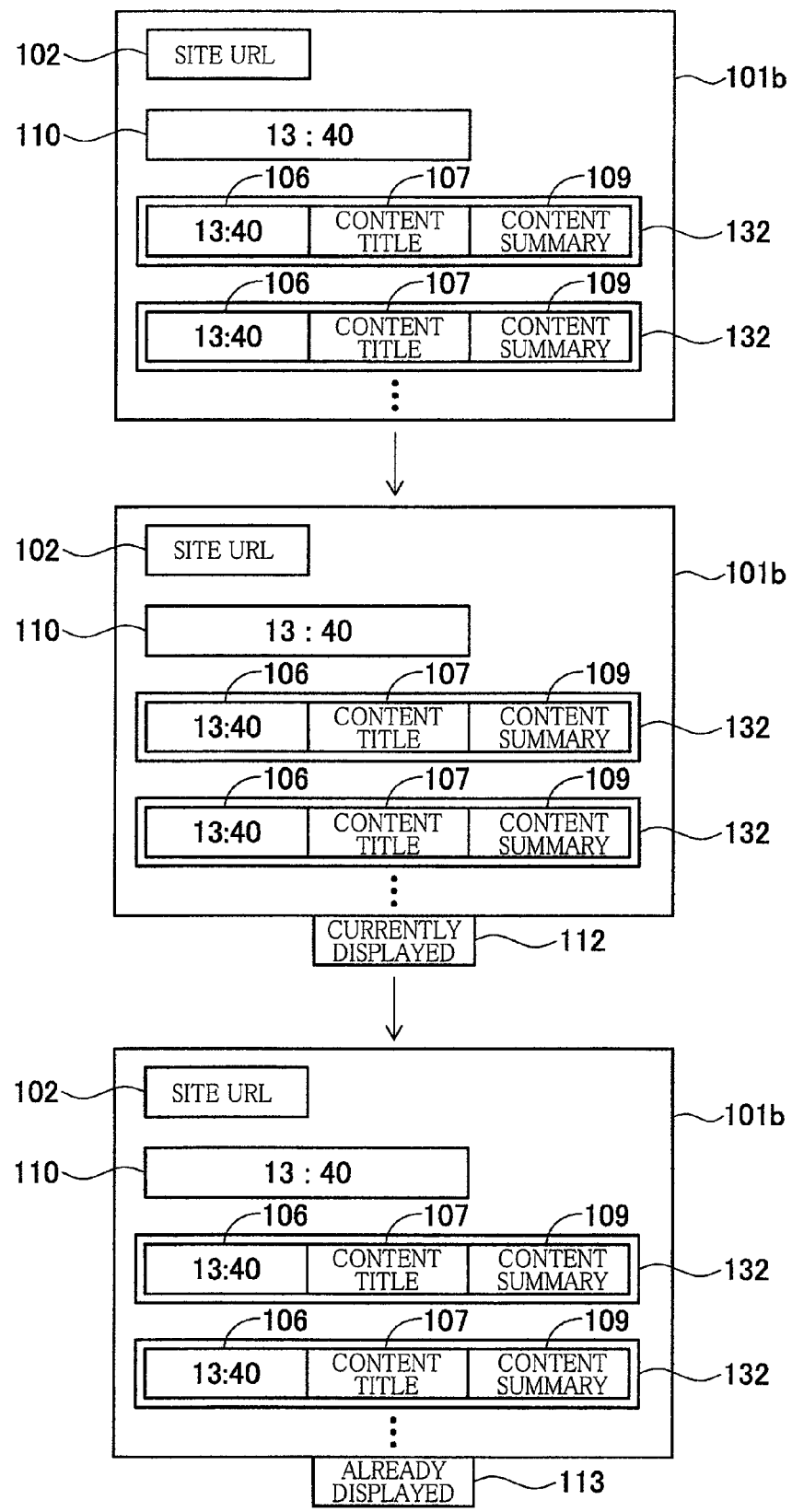
FIG. 7 is a conceptual view showing a content storage area in the display of the content.

There will be next explained an operation upon displaying the feed information 101*b* stored in the content storage area 37 with reference to FIGS. 6 and 7.

In S60, the CPU 14 judges whether or not the main power of the communication apparatus 10 has just been turned on or the communication apparatus 10 has just been returned from a sleep mode in which the communication apparatus 10 does not accept or receive the command from the user. Where the CPU 14 has judged that the main power of the communication apparatus 10 has just been turned on or the communication apparatus 10 has just been returned from the sleep mode (S60: YES), the processing goes to S70. Where the CPU 14 has judged that the main power of the communication apparatus 10 has just not been turned on or the communication apparatus 10 has just not been returned from the sleep mode (S60: NO), the processing goes to S61.

In S61, the CPU 14 judges whether the user has inputted a command for displaying the content information 132 into the communication apparatus 10 with the touch panel 50, the key pads 52, or the like. Where the CPU 14 has judged that the user has inputted the command (S61: YES), the processing goes to S70. Where the CPU 14 has judged that the user has not inputted the command (S61: NO), the processing goes to S60. In S70, the CPU 14 judges whether there is any feed information 101*b* to which the "ALREADY DISPLAYED" flag 113 is not attached among the feed informations 101*b* stored in the content storage area 37 or not. Where the CPU 14 has judged that there is no feed information 101*b* to which the "ALREADY DISPLAYED" flag 113 is not attached (S70: NO), all the feed informations 101*b* stored in the content storage area 37 have been displayed, and thus the processing goes to S68 in which the CPU 14 deletes all the "ALREADY DISPLAYED" flags 113 to each of which the feed information 101*b* is attached. On the other hand, where the CPU 14 has judged that there is any feed information 101*b* to which the "ALREADY DISPLAYED" flag 113 is not attached (S70: YES), there is any feed information 101*b* having not been displayed yet, and thus the processing goes to S62.

In S62, the CPU 14 selects, from the content storage area 37, the feed information 101*b* to which the latest feed-updated date and time 110 has been set, among the feed informations 101*b* to each of which the "ALREADY DISPLAYED" flag is not attached. It is noted that where there are a plurality of the latest feed-updated date and times 110, the CPU 14 randomly selects one of these latest feed-updated date and times 110.

In S63, the CPU 14 attaches the "CURRENTLY DISPLAYED" flag 112 to the feed information 101*b* selected in S62. In S64, the CPU 14 displays, on the touch panel 50, all the content informations 132 included in the feed information 101*b* selected in S62. It is noted that the CPU 14 displays in S64 both of the content title 107 and the content summary 109 as the content information 132 displayed on the touch panel 50. In S65, the CPU 14 attaches the "ALREADY DISPLAYED" flag 113 to the feed information 101*b* displayed in S64.

In S66, the CPU 14 deletes the "CURRENTLY DISPLAYED" flag 112 attached to the feed information 101*b* displayed in S64. In S67, the CPU 14 judges whether or not there is any feed information 101*b* to which the "ALREADY DISPLAYED" flag 113 is attached by referring the content storage area 37. Where there is any feed information 101*b* to which the "ALREADY DISPLAYED" flag 113 is attached (S67: YES), the processing goes to S62. Where there is no feed information 101*b* to which the "ALREADY DISPLAYED" flag 113 is attached (S67: NO), the processing goes to S68.

In S68, the CPU 14 deletes the "ALREADY DISPLAYED" flag 113 attached to each feed information 101*b* stored in the content storage area 37.

There will be next explained effects of the present first embodiment.

According to the present embodiment, the feed informations 101 stored in the content distribution servers 90, 91 can be displayed on the touch panel 50 in units of feeding in order from the latest or newest feed-updated date and time 110. Since later or more newly updated feed information 101 has a higher possibility of including new content information 132, the user can browse or look at the newly updated content information 132.

Further, even where the feed-updated date and time 110 has not been set in the obtained feed information 101, the time set in the content-updated date and time 106 can be set as the feed-updated date and time 110. Thus, all the content informations 132 included in the obtained feed information 101 can be displayed on the touch panel 50.

In this time, where there is any content information 132 to which the content-updated date and time 106 has not been set, the latest or newest content-updated date and time 106 is set as the content-updated date and time 106 of the unset content information 132 from the content informations 132 to each of which the content-updated date and time 106 has been set. Further, where there is or are, among the obtained feed information(s) 101, only the content information(s) 132 to each of which the content-updated date and time 106 has not been set, the current time information at which the feed information 101 has been obtained is set to the content information(s) 132 to which the content-updated date and time 106 has not been set. As a result, the content-updated date and time 106 is set to each content information 132 included in the feed information 101, whereby the feed-updated date and time 110 of the obtained feed information 101 is reliably set. Consequently, even where only the content information(s) 132 in each of which the content-updated date and time 106 has not been set exists or exist in the feed information 101, there can be restrained a problem or an error in which the content information(s) 132 in each of which the content-updated date and time 106 has not been set is or are not displayed on the touch panel 50.

Further, according to the processing of S38, the content-updated date and time 106 included in the content information 132 referred in S34 can be set as the content-updated date and time 106 included in the same content information 132 stored in the content storage area 37. Since there is the content-updated date and time 106 of the same content already stored, the feed-updated date and time 110 can be set to a more reliable value by referring the content-updated date and time 106 already stored, than the case in which the feed-updated date and time 110 is set to the current time information at which the feed information 101 has been obtained. Thus, it is possible to prevent that, each time when the content information 132 in which the content-updated date and time 106 has not been set is obtained, a new time obtained again is set even though the content information 132 has already been referred, and thereby the set new time is displayed with a high priority.

Figure 8:
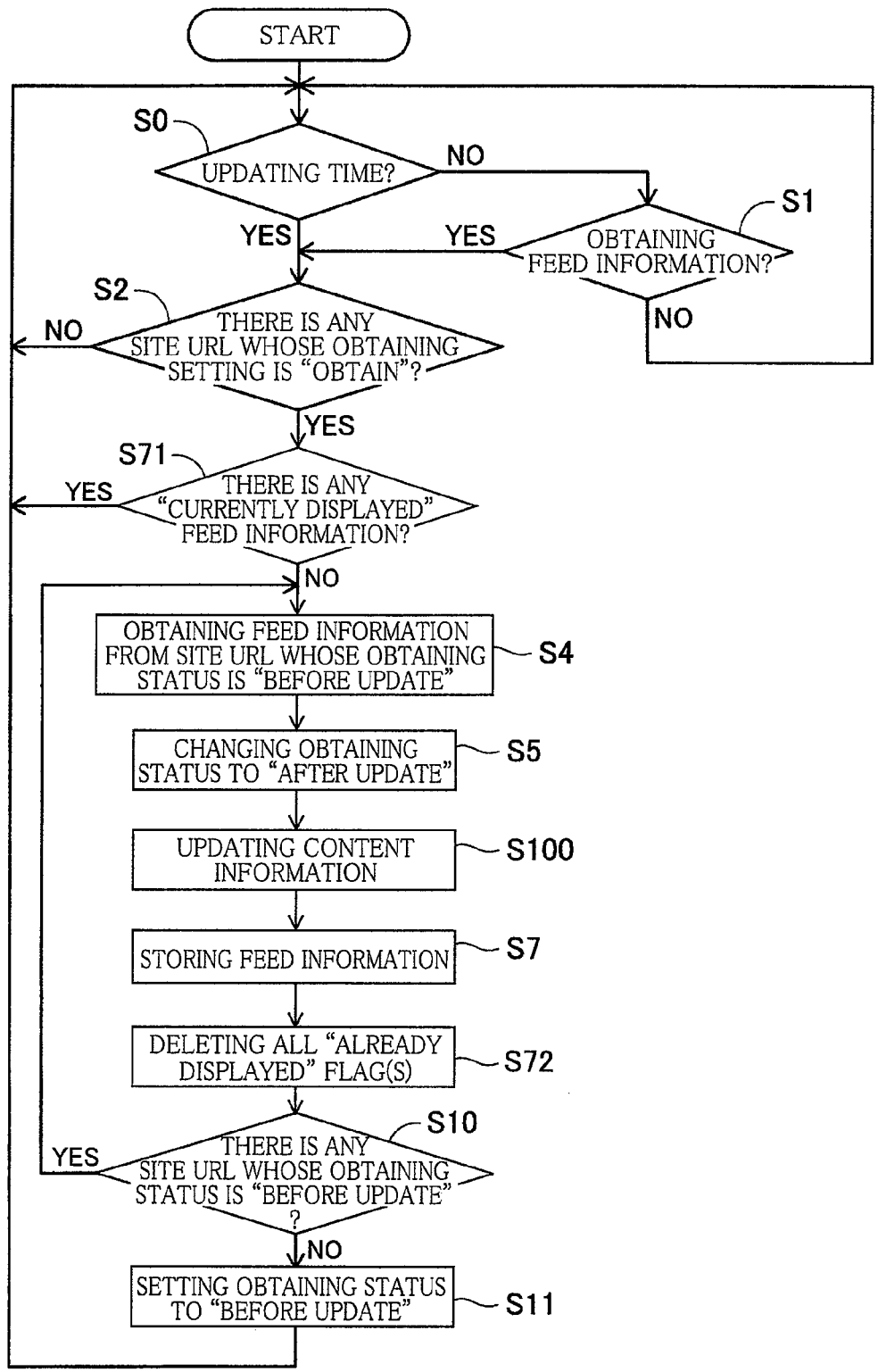
FIG. 8 is a flow-chart showing a main flow of a processing performed in a communication system as a second embodiment.

There will be next explained a second embodiment of the present invention. In this explanation, there is omitted an explanation of structures or operations in the second embodiment which are the same as those in the first embodiment. Like in the first embodiment, the content information 132 included in the feed information 101 is displayed on the touch panel 50 in the second embodiment, but a plurality of the content informations 132 included in certain feed information 110 are displayed in order from the latest or newest one of the plurality of the content informations 132 in the second embodiment. Initially, the communication system 2 as the second embodiment employs the same configuration as the first embodiment, and thus the explanation of the configuration of the communication system 2 is omitted. There will be next explained operations of the communication apparatus 10 in the second embodiment with reference to FIG. 8. FIG. 8 is a flow-chart showing a main processing performed by the communication apparatus 10 in the communication system 2 as the second embodiment. The processings of S0-S2 in the second embodiment are the same as those in the first embodiment.

Then, in S71, the CPU 14 judges whether a "CURRENTLY DISPLAYED" flag 112 is attached to any content information 132 included in the feed information 101b stored in the content storage area 37 or not. Here, the feed information 101b stored in the content storage area 37 is obtained before the current processing of S71 and stored in the content storage area 37 in past processings of S7 and S8 which will be described below. Where the CPU 14 has judged that there is any feed information 101b to which the "CURRENTLY DISPLAYED" flag 112 is attached (S71: YES), the processing goes to S0. Where the CPU 14 has judged that there is no feed information 101b to which the "CURRENTLY DISPLAYED" flag 112 is attached (S71: NO), the processing goes to S4. Here, the "CURRENTLY DISPLAYED" flag 112 is a mark set to the content information 132 in a processing of S63 which will be described below. Where the "CURRENTLY DISPLAYED" flag 112 is attached, the content information 132 included in the feed information 101b is being displayed on the touch panel 50. Subsequent processings of S4, S5, S100, and S7 in the second embodiment are the same as those in the first embodiment.

Figure 9:
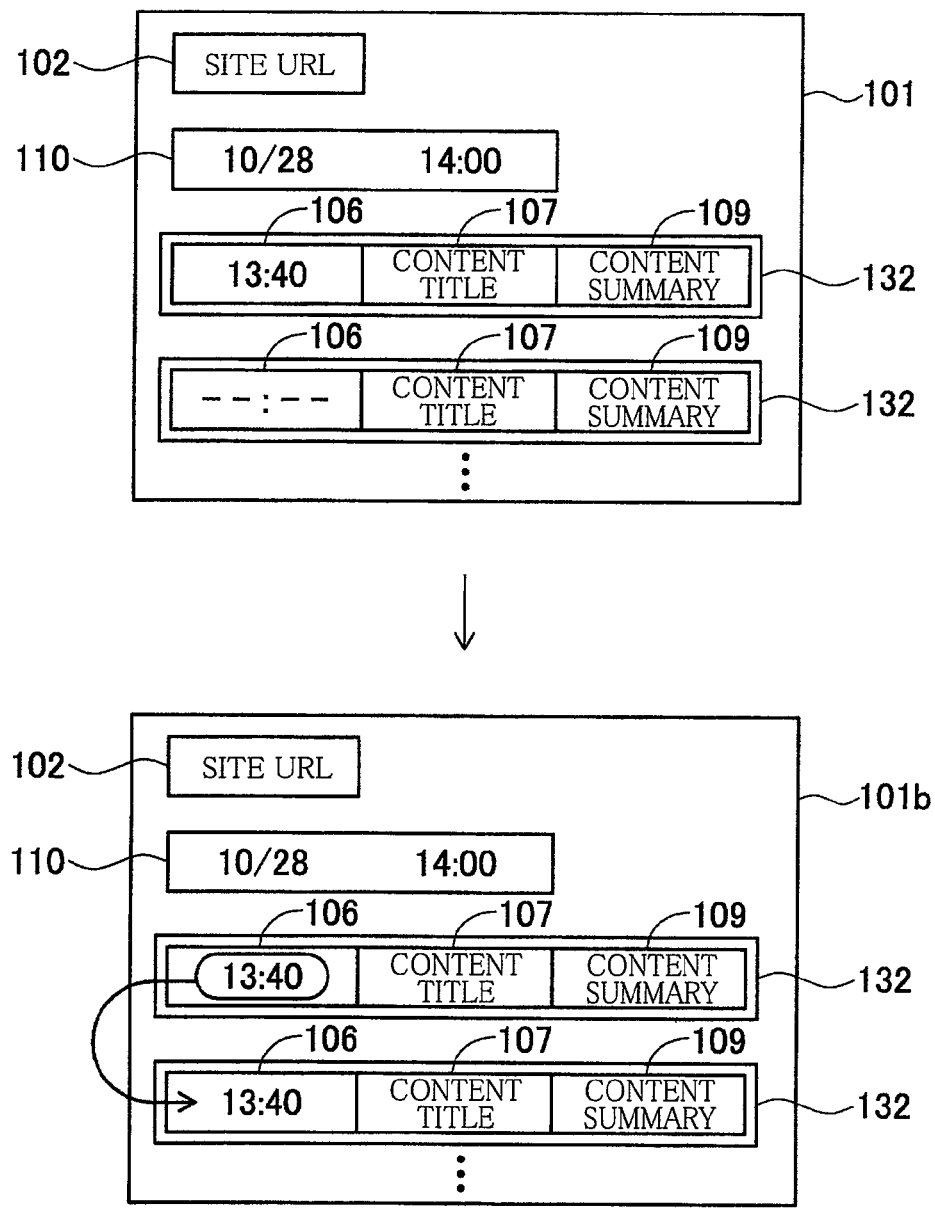
FIG. 9 is a conceptual view showing a change of information as a result of the update of the content in the communication system as the second embodiment.

Here, there will be explained effects of the processings of S100 and S7 with reference to FIG. 9. The feed information 101 in which the content-updated date and time 106 has not been set may sometimes exist among the feed information(s) 101 obtained in S4. However, as a result of the processing of S100, the content-updated date and time 106 is set to each content information 132 included in the feed information 101. Then, in the processing of S7, the CPU 14 stores each of the content informations 132 included in the feed information 101 stored in the feed-information-analysis work area 34, into the content storage area 37 in association with a corresponding one of the content-updated date and times 106. It is noted that the reference numeral 101b shown in FIG. 5 denotes the feed information 101b stored into the content storage area 37.

Then, in S72, the CPU 14 deletes all the "ALREADY DISPLAYED" flag(s) 113 attached to the feed information(s) 101b stored in the content storage area 37. Here, the "ALREADY DISPLAYED" flag 113 is a mark indicating whether the feed information 101b has been displayed on the touch panel 50 or not by a processing of S64 which will be described below. The "ALREADY DISPLAYED" flag 113 is used in order to avoid displaying, on the touch panel 50, the content information 132 displayed in the past. Subsequent processings of S10 and S11 in the second embodiment are the same as those in the first embodiment.

Figure 10:
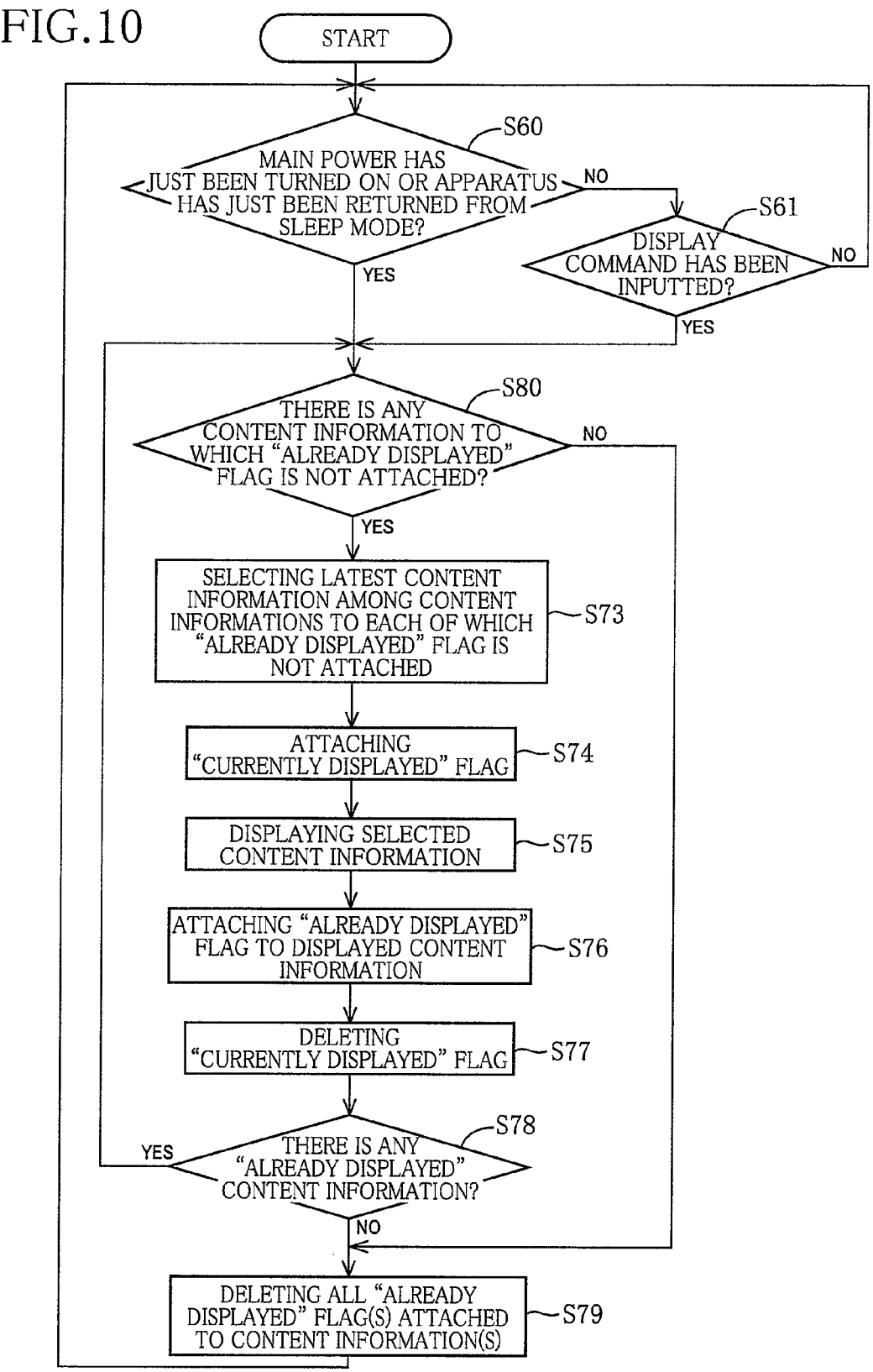
FIG. 10 is a flow-chart relating to a display of the content in the communication system as the second embodiment.
Figure 11:
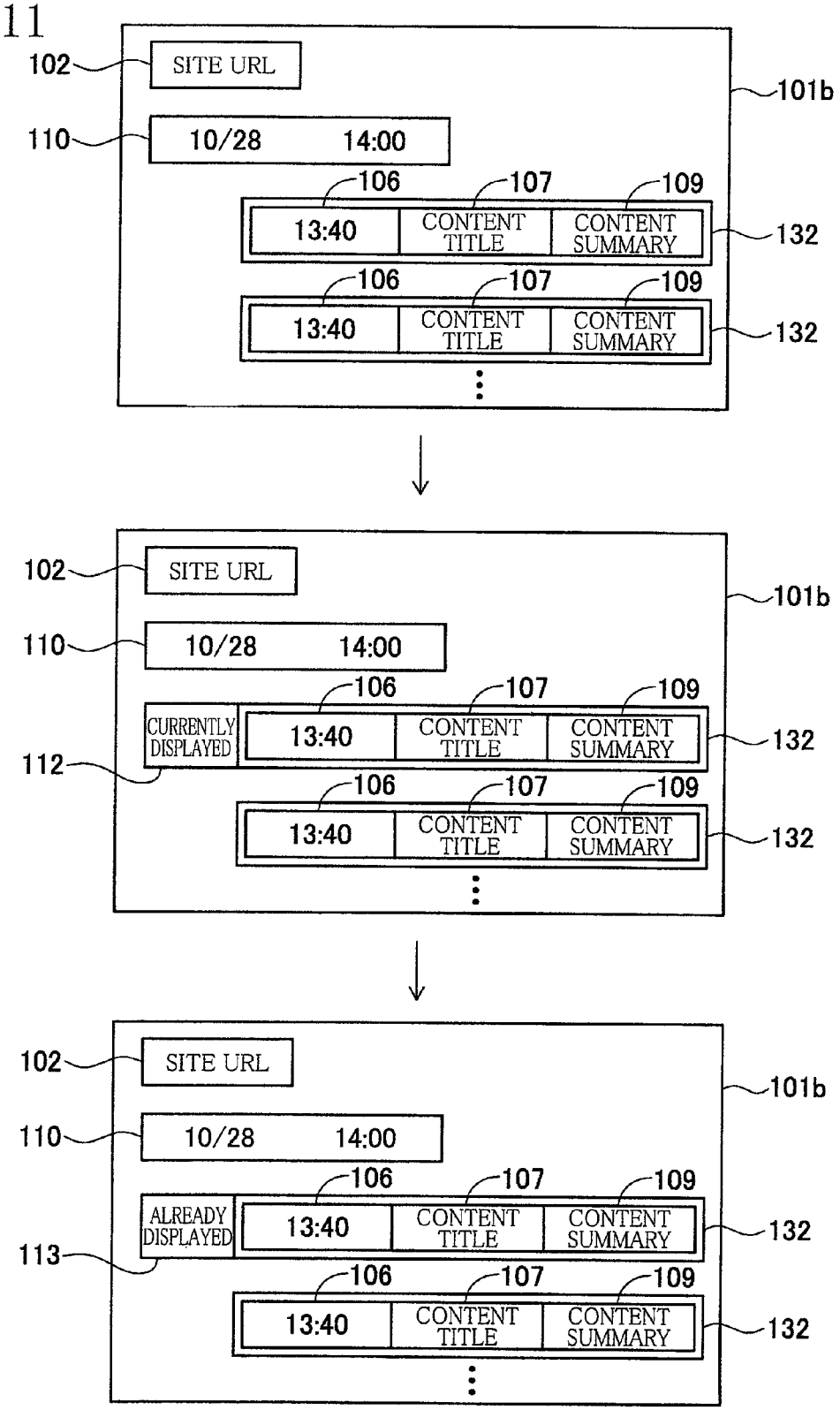
FIG. 11 is a conceptual view of a content storage area in the display of the content in the second embodiment.

There will be next explained, with reference to FIGS. 10 and 11, an operation performed when the content information 132 included in the feed information 101b stored in the content storage area 37 is displayed. FIG. 10 is a flow-chart relating to a display of the content in the second embodiment. FIG. 11 is a conceptual view of the content storage area 37 in the display of the content in the second embodiment.

Processings of S60 and S61 in FIG. 10 are the same as those in the first embodiment. Then, in S80, the CPU 14 judges whether there is any content information 132 to which the "ALREADY DISPLAYED" flag 113 is not attached among the content informations 132 included in the feed information 101b stored in the content storage area 37 or not. Where the CPU 14 has judged that there is no content information 132 to which the "ALREADY DISPLAYED" flag 113 is not attached (S80: NO), all the content informations 132 stored in the content storage area 37 have been displayed, and thus the processing goes to S79 in which the CPU 14 deletes the "ALREADY DISPLAYED" flag 113 attached to each content information 132. On the other hand, where the CPU 14 has judged that there is any content information 132 to which the "ALREADY DISPLAYED" flag 113 is not attached (S80: YES), there is any content information 132 having not been displayed yet, and thus the processing goes to S73

Then, in S73, the CPU 14 selects, from the content storage area 37, the content information 132 to which the latest content-updated date and time 106 has been set, among the content informations 132 to each of which the "ALREADY DISPLAYED" flag 113 is not attached. It is noted that where there are a plurality of the latest content-updated date and times 106, the CPU 14 randomly selects one of these latest content-updated date and time 106. Then, in S74, the CPU 14 attaches the "CURRENTLY DISPLAYED" flag 112 to the content information 132 selected in S73. Then, in S75, the CPU 14 displays, on the touch panel 50, the content information 132 selected in S73. Then, in S76, the CPU 14 attaches the "ALREADY DISPLAYED" flag 113 to the content information 132 displayed in S75. Then, in S77, the CPU 14 deletes the "CURRENTLY DISPLAYED" flag 112 attached to the content information 132 displayed in S75.

Then, in S78, the CPU 14 judges whether or not there is any content information 132 to which the "ALREADY DISPLAYED" flag 113 is attached by referring the content storage area 37. Where there is any content information 132 to which the "ALREADY DISPLAYED" flag 113 is attached (S78: YES), the processing goes to S80. Where there is no content information 132 to which the "ALREADY DISPLAYED" flag 113 is attached (S78: NO), the processing goes to S79. Then, in S79, the CPU 14 deletes the "ALREADY DISPLAYED" flag 113 attached to each content information 132 stored in the content storage area 37.

There will be next explained effects in the second embodiment. According to the present second embodiment, the content informations 132 included in the feed informations 101 stored in the content distribution servers 90, 91 can be displayed on the touch panel 50 in units of contents in order from the latest or newest content-updated date and time 106. Thus, the user can browse or look at the newly updated content information 132.

Further, even where the content-updated date and time 106 has not been set in the content information 132 included in the obtained feed information 101, the time based on the obtainment of the feed information 101 can be set. As a result, all the content informations 132 included in the obtained feed information 101 can be displayed on the touch panel 50.

Where there is any content information 132 in which the content-updated date and time 106 has not been set to the obtained feed information 101, the latest content-updated date and time 106 is set, as the content-updated date and time 106 of the unset content information 132, from the content informations 132 to each of which the content-updated date and time 106 has been set. Further, where only the content information 132 to which the content-updated date and time 106 has not been set is included in the obtained feed information 101 and where the feed-updated date and time 110 has been set to the obtained feed information 101, the feed-updated date and time 110 is set as the content-updated date and time 106. Further, where only the content information 132 to which the content-updated date and time 106 has not been set is included in the obtained feed information 101 and where the feed-updated date and time 110 has not been set to the obtained feed information 101, the current time information at which the feed information has been obtained is set to the content information 132 in which the content-updated date and time 106 has not been set. As a result, the content-updated date and time 106 is set to all the content informations 132 included in the obtained feed information 101, whereby the feed-updated date and time 110 of the obtained feed information 101 is reliably set. Thus, it is possible to restrain a problem or an error in which to the content information 132 is not displayed on the touch panel 50.

Further, according to the processing of S38, the content-updated date and time 106 included in the content information 132 referred in S34 can be set as the content-updated date and time 106 included in the same content information 132 stored in the content storage area 37. Since there is the content-updated date and time 106 of the same content already stored, the feed-updated date and time 110 can be set to a more reliable value by referring the content-updated date and time 106 already stored, than the case in which the feed-updated date and time 110 is set to the current time information at which the feed information 101 has been obtained. Thus, it is possible to prevent that, each time when the content information 132 in which the content-updated date and time 106 has not been set is obtained, a new time obtained again is set even though the content information 132 has already been referred, and thereby the content information 132 is displayed with a high priority.

Further, in the processing of S64, the CPU 14 displays the content information 132, but the present invention is not limited to this configuration. That is, the communication apparatus 10 may be configured such that the CPU 14 displays one of the content summary 109 and the content title 107 included in the content information 132.

While the embodiments of the present invention have been described above, it is to be understood that the invention is not limited to the details of the illustrated embodiments, but may be embodied with various changes and modifications, which may occur to those skilled in the art, without departing from the spirit and scope of the invention.

In the above-described embodiments, in the processings of S9 and S72, the CPU 14 deletes all the "ALREADY DISPLAYED" flags 113 attached to the feed informations 101b stored in the content storage area 37. However, the processings of S9 and S72 may be omitted. Where the processings of S9 and S72 are omitted, a history of the browsing is not deleted even where new feed information 101 has not been obtained, and the content information 132 is displayed until the user has browsed all the feed informations 101b stored in the content storage area 37. However, it is possible to restrain that the feed information 101b which has already been browsed by the user is displayed on the touch panel 50.

Further, in the processing of S64, the CPU 14 displays the content informations 132, but the present invention is not limited to this configuration. That is, the communication apparatus 10 may be configured such that the CPU 14 displays one of the content summary 109 and the content title 107 included in the content information 132.

The technological components described in the present specification or the drawings exhibit technological utility individually or in various combinations, and are not limited to the combinations disclosed in the claims at the time of application. Furthermore, the technology illustrated in the present specification or the drawings may simultaneously achieve a plurality of objects, and has technological utility by achieving one of these objects.

It is noted that, in the above-described first embodiment, the content informations 132 included in the feed informations 101 are displayed on the touch panel 50 in the units of feeding in order from the latest or newest feed information 106, but the present invention is not limited to this configuration. For example, the communication apparatus 10 may be configured such that the CPU 14 displays only the content informations 132 including the latest content-updated date and time 106 among the content informations 132 included in each feed information 101 in order from the latest feed-updated date and time 110.

In view of the above processings indicated by flow-charts in the first and second embodiments, the CPU 14 can be considered to include a feed-information obtaining portion which obtains the feed information 101 from the content distribution servers 90, 91, and which performs the processing of S4. Further, the CPU 14 can be considered to include an updated-date-and-time extracting portion that extracts, from the feed information 101 obtained by the feed-information obtaining portion, an updated date and time indicating a date and time at which information constituted by at least part of the feed information 101 has been updated, and that performs the processings of S62 and S73. Further, the CPU 14 can be considered to include an updated-date-and-time storing portion which stores, into the content storage area 37, the updated date and time extracted by the updated-date-and-time extracting portion and the information constituted by at least part of the feed information 101 in association with each other, and which performs the processings of S7 and S8. Further, the CPU 14 can be considered to include a feed-updated date-and-time extracting portion that extracts a feed-updated date and time indicating a date and time at which the feed information 101 has been updated, and that performs the processing of S62. Further, the CPU 14 can be considered to include a feed-updated date-and-time judging portion which judges whether the feed-updated date and time 110 is included in the feed information 101 obtained by the feed-information obtaining portion or not, and which performs the processing of S6. Further, the CPU 14 can be considered to include a feed-updated date-and-time setting portion which sets, where the feed-updated date-and-time judging portion has judged that the feed-updated date and time 110 is not included in obtained certain feed information 101, a date and time based on the obtainment of the certain feed information 101, to the feed-updated date and time 110 of the certain feed information 101, and which performs the processing of S8. Further, the CPU 14 can be considered to include a content-updated date-and-time judging portion which judges whether the content-updated date and time 106 is included in each of the content informations 132 included in the obtained certain feed information 101 or not, and which performs the processing of S46. Further, the CPU 14 can be considered to include a content-updated date-and-time setting portion which sets, where the content-updated date-and-time judging portion has judged that the content-updated date and time 106 is not included in certain content information 132 included in the certain feed information 101, a date and time based on the obtainment of the certain feed information 101, to the content-updated date and time 106 of the certain content information 132, and which performs the processings of S48, S49, and S50. Further, the CPU 14 can be considered to include a content presence-or-absence judging portion which judges whether content information 132 the same as certain content information 132 included in obtained certain feed information 101 has already been stored in the content storage area 37 or not, and which performs the processing of S36. Further, the CPU 14 can be considered to include a content-updated date-and-time replacing portion which replaces, where the content presence-or-absence judging portion has judged that the content information 132 the same as the certain content information 132 has already been stored in the content storage area 37, the content-updated date and time 106 of the certain content information 132 with an updated date and time of the content information 132 the same as the certain content information 132, and which performs the processing of S38. Further, the CPU 14 can be considered to include a content-updated date-and-time extracting portion which extracts the content-updated date and time 106, and which performs the processing of S73. Further, the CPU 14 can be considered to include a feed-updated date-and-time judging portion which judges whether the feed-updated date and time 110 is included in the certain feed information 101 or not, and which performs the processing of S47.

What is claimed is:

1. A communication apparatus comprising:
a communicating portion communicable with a server device storing feed information including a plurality of content informations each relating to a content;
a feed-information obtaining portion configured to obtain the feed information from the server device by using the communicating portion;
a display portion configured to display various informations;
a storage portion configured to store various informations;
an updated-date-and-time extracting portion configured to extract, from the feed information obtained by the feed-information obtaining portion, an updated date and time indicating a date and time at which information constituted by at least part of the feed information has been updated;
an updated-date-and-time storing portion configured to store, into the storage portion, the updated date and time extracted by the updated-date-and-time extracting portion and the information constituted by at least part of the feed information in association with each other; and
a display controller configured to display at least part of at least one content information corresponding to the information constituted by at least part of the feed information associated by the updated-date-and-time storing portion, on the display portion in order of the updated date and time from the latest one.

2. The communication apparatus according to claim 1, wherein the information constituted by at least part of the feed information is a unit of information upon updating in the server device.

3. The communication apparatus according to claim 1, wherein the information constituted by at least part of the feed information is the feed information itself,
wherein the updated-date-and-time extracting portion is a feed-updated date-and-time extracting portion configured to extract a feed-updated date and time indicating a date and time at which the feed information has been updated,
wherein the updated-date-and-time storing portion is a feed-updated date-and-time storing portion configured to store, into the storage portion, the feed-updated date and time extracted by the feed-updated date-and-time extracting portion and the feed information in association with each other, and
wherein the display controller is configured to display the at least part of the at least one content information included in each of a plurality of the feed informations associated by the feed-updated date-and-time storing portion, on the display portion in order of the feed-updated date-and-time from the latest one.

4. The communication apparatus according to claim 3, wherein the display controller is configured to display the at least part of the at least one content information included in each feed information associated by the feed-updated date-and-time storing portion, on the display portion in a unit of the feed information.

5. The communication apparatus according to claim 3, wherein the feed-updated date-and-time extracting portion includes;
a feed-updated date-and-time judging portion configured to judge whether the feed-updated date and time is included in the feed information obtained by the feed-information obtaining portion or not; and
a feed-updated date-and-time setting portion configured to set, where the feed-updated date-and-time judging portion has judged that the feed-updated date and time is not included in obtained certain feed information, a date and time based on the obtainment of the certain feed information, to the feed-updated date and time of the certain feed information, and
wherein the feed-updated date-and-time storing portion is configured to store, into the storage portion, the feed-updated date and time set by the feed-updated date-andtime setting portion and the certain feed information in association with each other.

6. The communication apparatus according to claim 5,
wherein each of the plurality of content informations is allowed to include a content-updated date and time indicating a date and time at which a web page linked from said each content information has been updated, and
wherein the feed-updated date-and-time setting portion is configured to set, where the feed-updated date-and-time judging portion has judged that the feed-updated date and time is not included in the obtained certain feed information, the content-updated date and time of one of the plurality of content informations included in the certain feed information, as the date and time based on the obtainment of the certain feed information, to the feed-updated date and time of the certain feed information.

7. The communication apparatus according to claim 6, further comprising:
a content-updated date-and-time judging portion configured to judge whether the content-updated date and time is included in each of the plurality of content informations included in the obtained certain feed information or not; and
a content-updated date-and-time setting portion configured to set, where the content-updated date-and-time judging portion has judged that the content-updated date and time is not included in certain content information included in the certain feed information, a date and time based on the obtainment of the certain feed information to the content-updated date and time of the certain content information.

8. The communication apparatus according to claim 7,
wherein the content-updated date-and-time setting portion is configured to set, where the certain feed information contains (a) the certain content information not including the content-updated date and time and (b) at least one other content information each including the content-updated date and time, the content-updated date and time of one of the at least one other content information, as the date and time based on the obtainment of the certain feed information, to the content-updated date and time of the certain content information.

9. The communication apparatus according to claim 8,
wherein the content-updated date-and-time setting portion is configured to set, to the content-updated date and time of the certain content information, the latest one of at least one content-updated date and time of the at least one other content information, as the date and time based on the obtainment of the certain feed information.

10. The communication apparatus according to claim 3,
wherein each of the plurality of content informations is allowed to include a content-updated date and time indicating a date and time at which a web page linked from said each content information has been updated,
wherein the communication apparatus further comprising:
a content-updated date-and-time judging portion configured to judge whether the content-updated date and time is included in each of the plurality of content informations included in obtained certain feed information or not; and
a content-updated date-and-time setting portion configured to set, where the content-updated date-and-time judging portion has judged that the content-updated date and time is not included in certain content information included in the certain feed information, a date and time based on the obtainment of the certain feed information, to the content-updated date and time of the certain content information, and
wherein the content-updated date-and-time setting portion is configured to set, where the content-updated date-and-time judging portion has judged that the content-updated date and time is not included in any of the plurality of content informations included in the certain feed information, the feed-updated date and time of the certain feed information, as the date and time based on the obtainment of the certain feed information, to the content-updated date and time of each of the plurality of the content informations not including the content-updated date and time.

11. The communication apparatus according to claim 7,
wherein the content-updated date-and-time setting portion is configured to set, where the feed-updated date-and-time judging portion has judged that the feed-updated date and time is not included in the certain feed information, and the content-updated date-and-time judging portion has judged that the content-updated date and time is not included in any of the plurality of content informations included in the certain feed information, a date and time at which the certain feed information has been obtained, as the date and time based on the obtainment of the certain feed information, to the content-updated date and time of each of the plurality of content informations not including the content-updated date and time.

12. The communication apparatus according to claim 3, further comprising:
a content presence-or-absence judging portion configured to judge whether content information the same as certain content information included in obtained certain feed information has already been stored in the storage portion or not; and
a content-updated date-and-time replacing portion configured to replace, where the content presence-or-absence judging portion has judged that the content information the same as the certain content information has already been stored in the storage portion, the content-updated date and time of the certain content information with an updated date and time of the content information the same as the certain content information.

13. The communication apparatus according to claim 6,
wherein the feed-updated date-and-time setting portion is configured to set, where the feed-updated date-and-time judging portion has judged that the feed-updated date and time is not included in the certain feed information, the latest one of the content-updated date and times of the respective content informations included in the certain feed information, as the date and time based on the obtainment of the certain feed information, to the feed-updated date and time of the certain feed information.

14. The communication apparatus according to claim 1,
wherein the information constituted by at least part of the feed information is each of the plurality of content informations included in the feed information,
wherein the updated-date-and-time extracting portion is a content-updated date-and-time extracting portion configured to extract a content-updated date and time indicating a date and time at which a web page linked from each of the plurality of content informations has been updated,
wherein the updated-date-and-time storing portion is a content-updated date-and-time storing portion configured to store, into the storage portion, the content-updated date and time extracted by the content-updated date-and-time extracting portion and the content information in association with each other, and wherein the display controller is configured to display the at least part of at least one content information associated by the content-updated date-and-time storing portion, on the display portion in order of the content-updated date and time from the latest one.

15. The communication apparatus according to claim 14, wherein the content-updated date-and-time extracting portion includes:
   a content-updated date-and-time judging portion configured to judge whether the content-updated date and time is included in each of the plurality of content informations included in certain feed information obtained by the feed-information obtaining portion or not; and
   a content-updated date-and-time setting portion configured to set, where the content-updated date-and-time judging portion has judged that the content-updated date and time is not included in certain content information included in the certain feed information, a date and time based on the obtainment of the certain feed information, to the content-updated date and time of the certain content information, and
wherein the content-updated date-and-time storing portion is configured to store, into the storage portion, the content-updated date and time set by the content-updated date-and-time setting portion and the certain content information in association with each other.

16. The communication apparatus according to claim 15, wherein the content-updated date-and-time setting portion is configured to set, where the certain feed information contains (a) the certain content information not including the content-updated date and time and (b) at least one other content information each including the content-updated date and time, the content-updated date and time of one of the at least one other content information, as the date and time based on the obtainment of the certain feed information, to the content-updated date and time of the certain content information.

17. The communication apparatus according to claim 15, wherein the feed information is allowed to include a feed-updated date and time indicating a date and time at which the feed information has been updated, wherein the content-updated date-and-time setting portion includes a feed-updated date-and-time judging portion configured to judge whether the feed-updated date and time is included in the certain feed information or not, and wherein the content-updated date-and-time setting portion is configured to set, where the feed-updated date-and-time judging portion has judged that the feed-updated date and time is included in the certain feed information, and the content-updated date-and-time judging portion has judged that the content-updated date and time is not included in any of the plurality of content informations included in the certain feed information, the feed-updated date and time of the certain feed information, as the date and time based on the obtainment of the certain feed information, to the content-updated date and time of each of the plurality of content informations included in the certain feed information.

18. The communication apparatus according to claim 15, wherein the feed information is allowed to include a feed-updated date and time indicating a date and time at which the feed information has been updated, wherein the content-updated date-and-time setting portion includes a feed-updated date-and-time judging portion configured to judge whether the feed-updated date and time is included in the certain feed information or not, and wherein the content-updated date-and-time setting portion is configured to set, where the feed-updated date-and-time judging portion has judged that the feed-updated date and time is not included in the certain feed information, and the content-updated date-and-time judging portion has judged that the content-updated date and time is not included in any of the plurality of content informations included in the certain feed information, a date and time at which the certain feed information has been obtained, as the date and time based on the obtainment of the certain feed information, to the content-updated date and time of each of the plurality of content informations included in the certain feed information.

19. The communication apparatus according to claim 14, further comprising:
   a content presence-or-absence judging portion configured to judge whether content information the same as certain content information included in obtained certain feed information has already been stored in the storage portion or not; and
   a content-updated date-and-time replacing portion configured to replace, where the content presence-or-absence judging portion has judged that the content information the same as the certain content information has already been stored in the storage portion, the content-updated date and time of the certain content information with the content-updated date and time of the content information the same as the certain content information.

20. A non-transitory storage medium storing a program executed by a communication apparatus including (a) a communicating portion communicable with a server device storing feed information including a plurality of content informations each indicating a content, (b) a display portion configured to display various informations, and (c) a storage portion configured to store various informations, the program comprising: obtaining the feed information from the server device by using the communicating portion; extracting, from the feed information, an updated date and time indicating a date and time at which information constituted by at least part of the feed information has been updated; storing, into the storage portion, the extracted updated date and time and the information constituted by at least part of the feed information in association with each other; and displaying at least part of at least one content information corresponding to the information constituted by at least part of the feed information associated by the updated-date-and-time storing portion, on the display portion in order of the updated date and time from the latest one.

* * * * *